(12) United States Patent
Jung et al.

(10) Patent No.: US 8,401,541 B2
(45) Date of Patent: Mar. 19, 2013

(54) METHOD AND APPARATUS FOR SCANNING IN MULTI-CARRIER COMMUNICATION SYSTEM

(75) Inventors: Soo Jung Jung, Daejeon (KR); Sung Chool Chang, Daejeon (KR); Kwang Jao Lim, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 469 days.

(21) Appl. No.: 12/555,525

(22) Filed: Sep. 8, 2009

(65) Prior Publication Data

US 2010/0062765 A1 Mar. 11, 2010

(30) Foreign Application Priority Data

Sep. 5, 2008 (KR) .................. 10-2008-0087917
Aug. 11, 2009 (KR) .................. 10-2009-0073938

(51) Int. Cl.
*H04B 1/18* (2006.01)
*H04W 4/00* (2009.01)
*H04W 36/00* (2009.01)

(52) U.S. Cl. .................. 455/422.1; 455/161.1; 455/434; 455/436

(58) Field of Classification Search .................. 455/434, 455/436–438, 161.1–161.3
See application file for complete search history.

(56) References Cited

U.S. PATENT DOCUMENTS

| | | | | |
|---|---|---|---|---|
| 7,920,868 B2* | 4/2011 | Lim et al. | | 455/436 |
| 2005/0101330 A1* | 5/2005 | Chang et al. | | 455/446 |
| 2005/0250499 A1* | 11/2005 | Lee et al. | | 455/437 |
| 2005/0282547 A1* | 12/2005 | Kim et al. | | 455/436 |
| 2007/0054667 A1* | 3/2007 | Lee et al. | | 455/434 |
| 2007/0123255 A1* | 5/2007 | Chae | | 455/434 |
| 2008/0096564 A1* | 4/2008 | Jung et al. | | 455/436 |
| 2008/0227448 A1* | 9/2008 | Kim et al. | | 455/434 |
| 2009/0296659 A1* | 12/2009 | Lim et al. | | 370/331 |
| 2009/0318154 A1* | 12/2009 | Lee et al. | | 455/438 |
| 2010/0029279 A1* | 2/2010 | Lee et al. | | 455/436 |
| 2012/0093007 A1 | 4/2012 | Kang et al. | | |

FOREIGN PATENT DOCUMENTS

KR 10-2008-0066898 7/2008

OTHER PUBLICATIONS

Soojung Jung, et al., "Scanning Mode for Multi-Carrier Operation," IEEE S802.16m-08/1153, Sep. 5, 2008.

* cited by examiner

*Primary Examiner* — Simon Nguyen
(74) *Attorney, Agent, or Firm* — Staas & Halsey LLP (57) ABSTRACT

There are provided a method and an apparatus for scanning in a mobile communication system supporting a multi-carrier. For this, the scanning method includes: in a mobile station supporting a multi-carrier including a primary carrier and a secondary carrier, requesting allocation of a scanning interval to a serving base station by using the primary carrier; receiving a response message for designating the scanning interval and a carrier to be used for scanning from the serving base station; and scanning neighbor base stations by using the carrier designated by the response message in the scanning interval. Transaction data is continuously transmitted and received through the remaining carriers while scanning the neighbor base stations by using the primary carrier or the secondary carrier without interruption.

12 Claims, 7 Drawing Sheets

METHOD AND APPARATUS FOR SCANNING IN MULTI-CARRIER COMMUNICATION SYSTEM

CROSS-REFERENCE TO RELATED APPLICATION

This application claims priority to and the benefit of Korean Patent Application Nos. 10-2008-0087917 and 10-2009-0073938 filed in the Korean Intellectual Property Office on Sep. 5, 2008 and Aug. 11, 2009, the entire contents of which are incorporated herein by reference.

BACKGROUND OF THE INVENTION (a) Field of the Invention

An exemplary embodiment of the present invention relates to a method and an apparatus for scanning in a mobile communication system supporting a multi-carrier.

(b) Description of the Related Art

In a mobile communication environment, a state of a mobile station that succeeds in accessing a serving base station (BS) is classified as a base station connected state, and may be departmentalized into an active mode for transmitting and receiving data traffic, a power saving mode, and a scanning mode for collecting information on a neighbor BS in accordance with an operation performed by the mobile station.

In the mobile communication environment using a multi-carrier, the mobile station is connected to the base station through one carrier, and the base station manages the state and mobility of the mobile station through the carrier. The carrier that the mobile station uses to connect the base station is referred to as a primary carrier, and the mobile station transmits and receives the data traffic to and from the serving BS through the primary carrier. Further, the mobile station may additionally use a secondary carrier for transmitting and receiving the traffic.

The primary carrier is a fully configured carrier that includes a synchronization channel, a broadcast and multicast channel, and a unicast control channel for controlling transmission and reception of data. Each mobile station has only one carrier as the primary carrier in the serving BS. Contrary to this, the secondary carrier may be configured by the full configured carrier, but may be configured by a partially configured carrier that includes only the control channels for necessarily requiring the transmission and reception of the data.

The mobile station supporting the multi-carrier interrupts the transmission and reception of the data traffic to and from the serving BS, and performs only scanning of another neighbor BS for a predetermined period at the time of performing scanning in order to acquire information on the neighbor BS. Further, scanning may be performed through an additional carrier while the data traffic is transmitted to and received from the serving BS by using one carrier. For this, the known mobile communication system determines the state of the mobile station by integrally considering operation states of all carriers, and more particularly, the state and mobility of the mobile station including a scanning operation of the mobile station are managed through the primary carrier.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention has been made in an effort to provide a method for performing scanning by using a predetermined carrier while observing a known rule for a scanning operation of a mobile station without interruption of data traffic transaction.

An embodiment of the present invention is a method for scanning in a mobile station supporting a multi-carrier including a primary carrier and a secondary carrier including the steps of requesting allocation of a scanning interval to a serving base station by using the primary carrier; receiving a response message for designating the scanning interval and a carrier to be used for scanning from the serving base station; and scanning neighbor base stations by using the carrier designated by the response message in the scanning interval.

Another embodiment of the present invention is a scanning apparatus supporting a multi-carrier including a primary carrier and a secondary carrier including a transaction module that performs data traffic transaction with a serving base station by using the primary carrier; a scanning control module that receives a message for designating a scanning interval and a carrier that will perform scanning from the serving base station; and a scanning module that scans neighbor base stations by using the carrier designated by the message in the scanning interval.

DETAILED DESCRIPTION OF THE EMBODIMENTS

In the following detailed description, only certain exemplary embodiments of the present invention have been shown and described, simply by way of illustration. Accordingly, the drawings and description are to be regarded as illustrative in nature and not restrictive. Like reference numerals designate like elements throughout the specification. Further, In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), user equipment (UE), a mobile terminal (MT), a subscriber station (SS), a portable subscriber station (PSS), an access terminal (AT), etc., or and may include the entire or partial functions of the terminal, the mobile terminal, the subscriber station, the portable subscriber station, the user equipment, the access terminal, etc.

In the specification, the base station (BS) may designate an evolved node B (eNodeB), an access point (AP), a radio access station (RAS), a node-B, a base transceiver station (BTS), a mobile multihop relay (MMR)-BS, etc., and may include the entire or partial functions of the BS, the AP, the RAS, the node-B, the BTS, the MMR-BS, etc.

In the specification, a secondary carrier represents a predetermined carrier other than a primary carrier included in a multi-carrier, and it is not limited that the multi-carrier is composed of two carriers.

Figure 1:
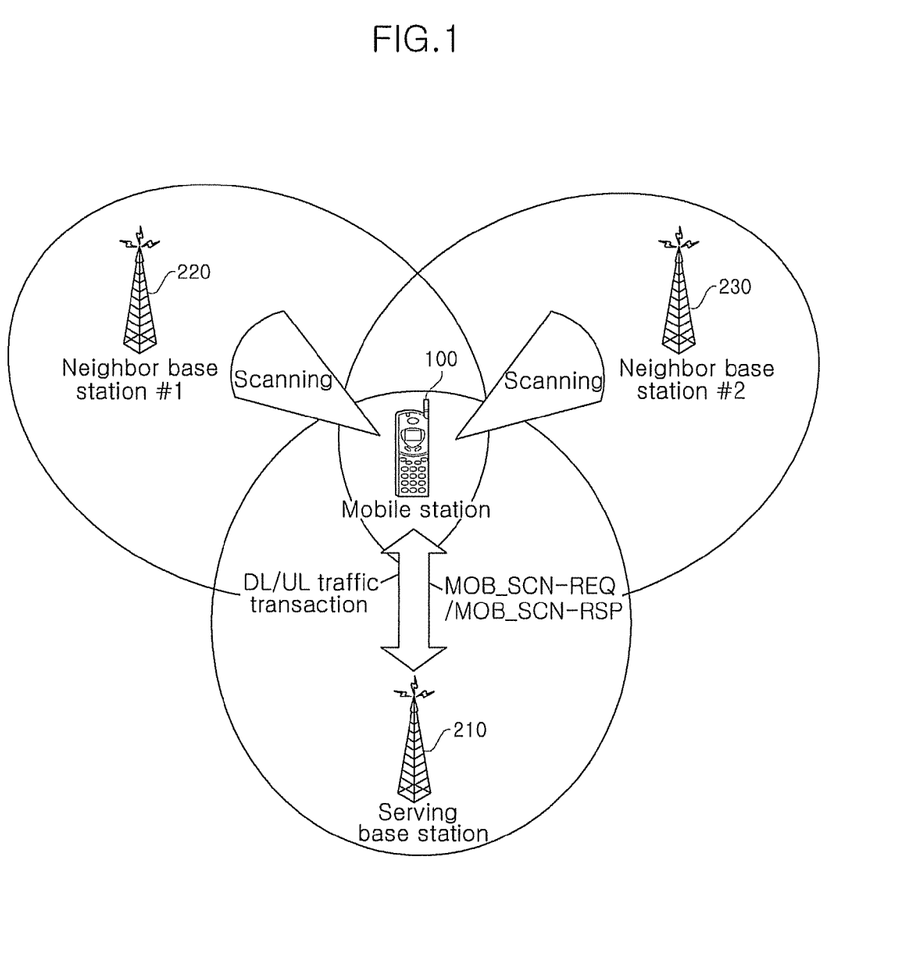
FIG. 1 is a structural diagram schematically illustrating a mobile communication system in which embodiments of the present invention are adopted.

FIG. 1 is a structural diagram schematically illustrating a mobile communication system in which embodiments of the present invention are adopted.

A mobile station 100 and base stations 210, 220, and 230 of the mobile communication system in which embodiments of the present invention are adopted support a multi-carrier.

In the embodiments of the present invention, the mobile station 100 performs a scanning operation through a predetermined carrier among a plurality of carriers, and transmits and receives general data to and from a serving base station (BS) 210 without interruption through another carrier that is not used for scanning. This will be described in detail with reference to FIG. 1.

While the mobile station 100 performs uplink and downlink data traffic transactions with the serving base station 210 by using the multi-carrier in an active mode, when a signal of the serving base station 210 that the base station 100 is currently accessing becomes weak or irregular, scanning of the neighbor base stations 220 and 230 for handover is started.

That is, when a situation that meets a predetermined condition to update a position occurs, the mobile station 100 transmits a message (i.e., MOB_SCN-REQ) to request allocation of a scanning interval to the serving base station 210 through the primary carrier among the multi-carriers. At this time, the request message may include information on a carrier that requests the scanning interval to be allocated. For this, the serving base station 210 transmits a response message (i.e., MOB_SCN-RSP) designating the size of the scanning interval to the mobile station 100 through the primary carrier. The response message includes information on a carrier used for scanning in the corresponding scanning interval.

An operation interval in which the mobile station 100 scans the neighbor base stations 220 and 230 is referred to as the scanning interval. The scanning interval is allocated alternately with the operation interval in which the general data is transmitted and received. Scanning the neighbor base stations 220 and 230 is performed while aiming at a fully configured carrier of the neighbor base stations.

The mobile station 100 communicates with the neighbor base stations 220 and 230 through the primary carrier or the secondary carrier designated to be used for scanning during the scanning interval designated in the response message. At this time, another carrier that does not perform scanning performs transmission and reception of data traffic to and from the serving base station 210 without interruption. For this, a control channel for transmitting and receiving the data traffic should be configured in another carrier that does not perform scanning.

Hereinafter, detailed embodiments will be described.

First Embodiment

The first embodiment relates to a case in which a scanning related control message is transmitted and received through a primary carrier and an actual scanning operation is performed through a secondary carrier.

Figure 2:
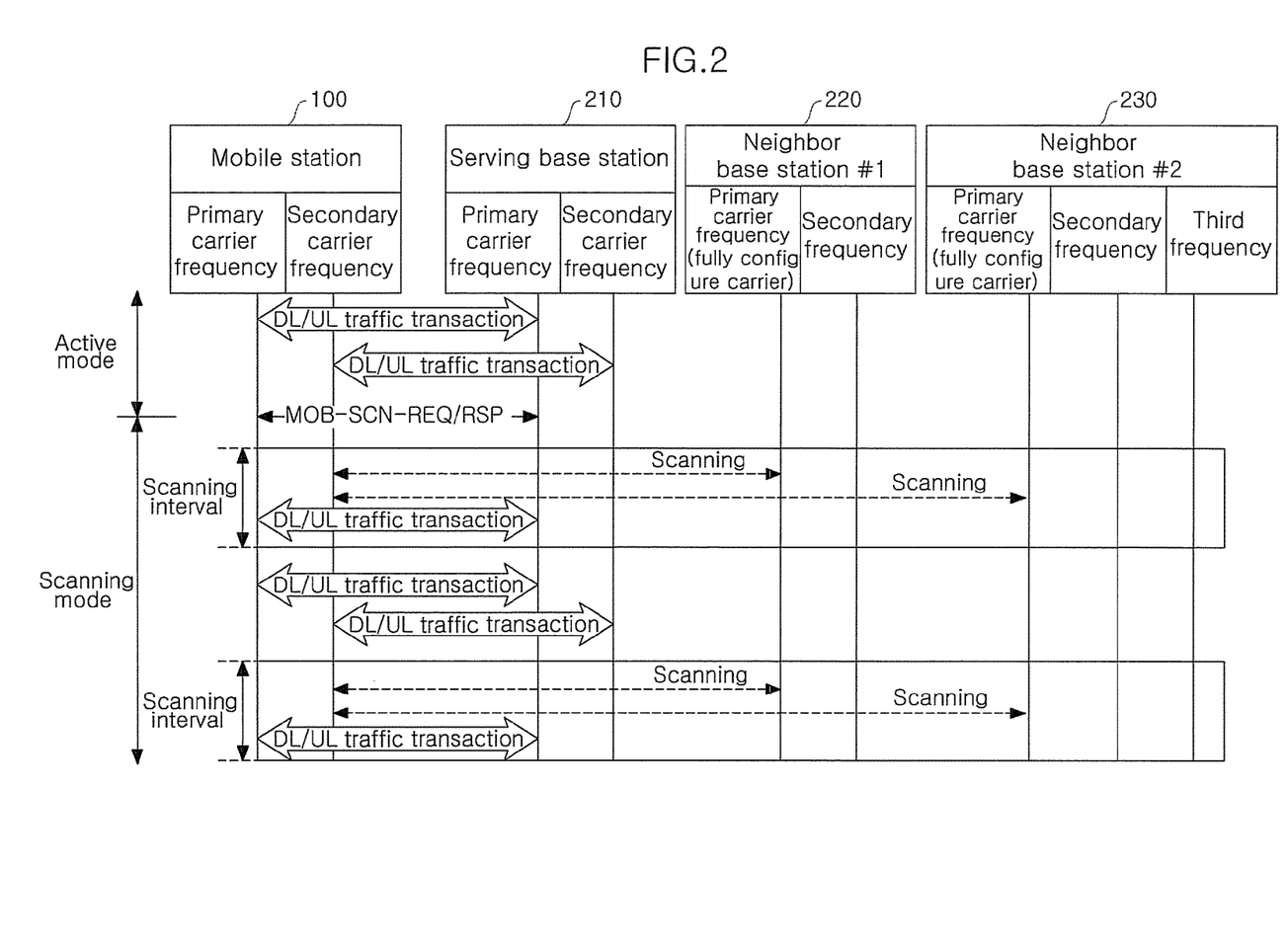
FIG. 2 is a signal flow diagram for describing a scanning operation according to a first embodiment of the present invention.
Figure 3:
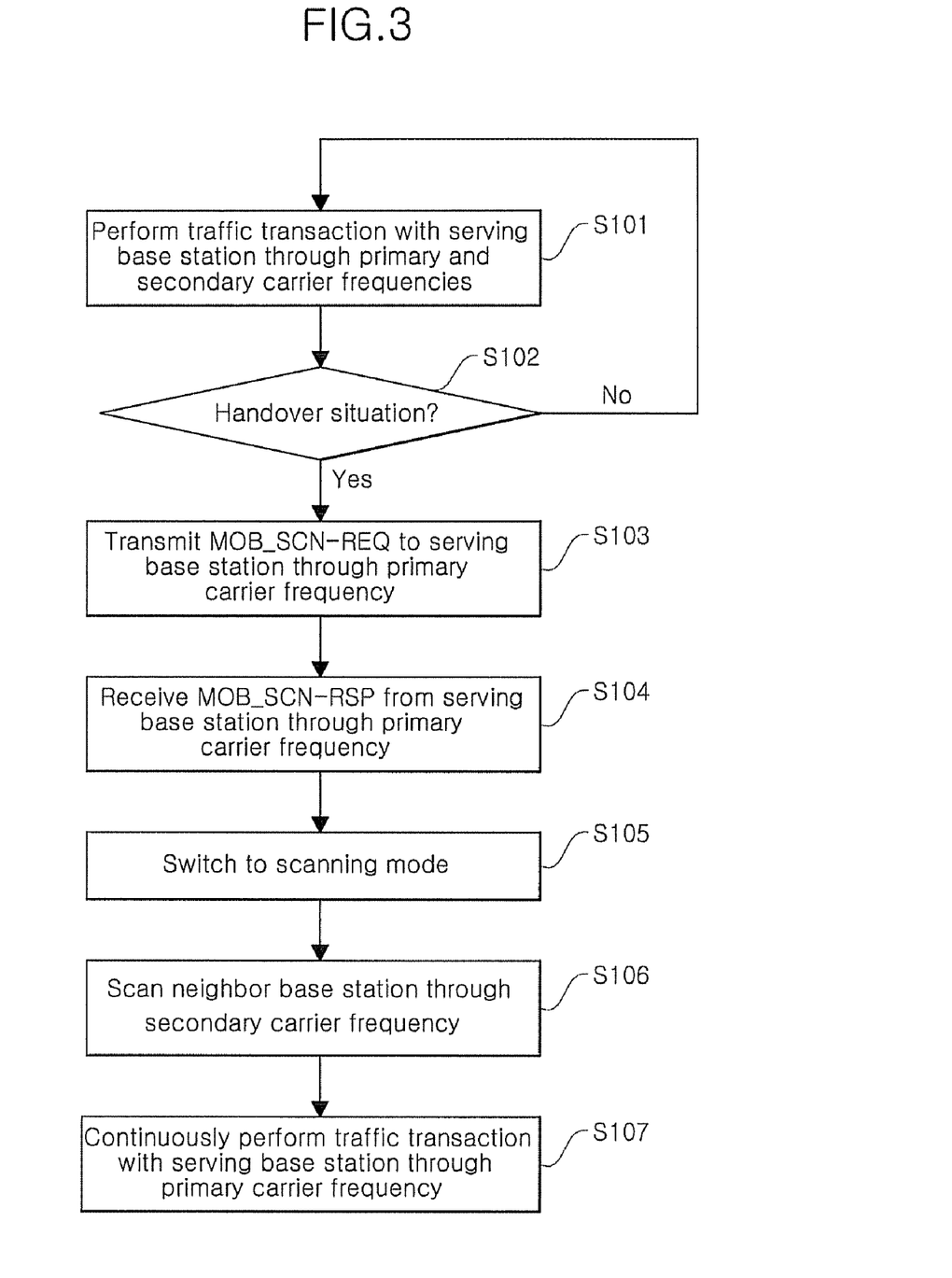
FIG. 3 is a flowchart sequentially illustrating a scanning operation in accordance with a signal flow diagram of FIG. 2.

FIG. 2 is a signal flow diagram for describing a scanning operation according to a first embodiment, and FIG. 3 is a flowchart sequentially illustrating a scanning operation in accordance with the signal flow diagram.

In an active mode, the mobile station 100 performs uplink and downlink data traffic transactions with the serving base station 210 by using the primary carrier and the secondary carrier (S101).

When the mobile station 100 determines a situation in which handover is required while monitoring a reception signal from the serving base station 210 (S102), the mobile station 100 transmits a message (i.e., MOB_SCN-REQ) to request allocation of a scanning interval to the serving base station 210 through the primary carrier (S103).

When the serving base station 210 that receives the request message determines whether or not the scanning interval is allocated by considering a communication environment for the corresponding mobile station 100 and determines that scanning is required, the serving base station 210 transmits a response message (i.e., MOB_SCN-RSP) designating the size of the scanning interval and a carrier to be used for scanning to the mobile station 100 through the primary carrier (S104).

Even when there is no request message (i.e., MOB_SCN-REQ) from the mobile station 100, the serving base station 210 may arbitrarily direct a unsolicited scanning operation to the mobile station 100 through the primary carrier. In this case, the serving base station can transmit the direction of the scanning operation through a predetermined message (i.e., MOB_SCN-RSP).

The mobile station 100 that receives the response message switches an operation mode of the mobile station 100 from the active mode to a scanning mode regardless of an operation state of other carriers than the primary carrier (S105), and designates the secondary carrier as a carrier for scanning as designated in the response message. Thereafter, in the scanning mode, only the scanning operation is performed with neighbor base stations 220 and 230 by the secondary carrier, and transmission and reception of general data to and from the serving base station 210 are excluded.

In the scanning mode, when the scanning interval arrives, the mobile station 100 performs the scanning of the neighbor base stations 220 and 230 through the secondary carrier (S106), while the general data is continuously transmitted and received through the primary carrier (S107). In addition, in the scanning mode, when the scanning interval is deviated, the general data is transmitted to and received from the serving base station 210 through the primary carrier and the secondary carrier.

Figure 4:
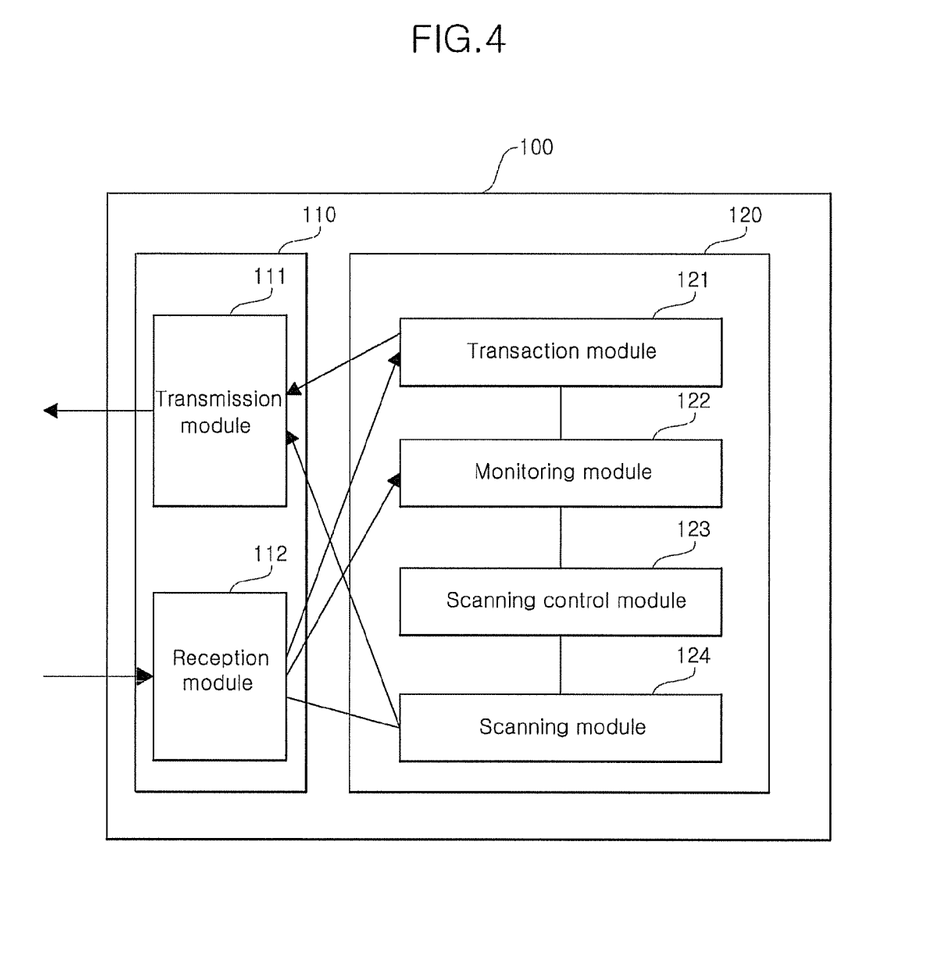
FIG. 4 is a block diagram schematically illustrating a configuration of a mobile station that performs a scanning operation of a first embodiment.

FIG. 4 is a block diagram schematically illustrating a configuration of a mobile station that performs a scanning operation of a first embodiment. The mobile station 100 according to the first embodiment includes a communication unit 110 and a control unit 120.

The communication unit 110 includes a transmission module 111 including a channel encoder, an adaptive mapper, and a modulator, and a reception module 112 including a channel decoder, a demapper, and a demodulator. In addition, the control unit 120 includes a transaction module 121, a monitoring module 122, a scanning control module 123, and a scanning module 124.

The channel encoder of the transmission module 111 receives a predetermined stream of information bits, and encodes the received information bits in accordance with a predetermined coding scheme to form coded data. The mapper maps the coded data of the stream of information bits to symbols expressing a position in accordance with a predetermined amplitude and a predetermined phase constellation. The modulator modulates a transmission symbol in accordance with a single-carrier modulation scheme such as CDMA, or a multiple access modulation scheme such as a multi-carrier modulation scheme, etc., such as OFDM. The channel decoder, the demapper, and the demodulator of the reception module 112 take opposite roles to the channel decoder, the mapper, and the modulator, respectively.

The control unit 120 includes the transaction module 121, the monitoring module 122, the scanning control module 123, and the scanning module 124.

The transaction module 121 performs data traffic transaction with the serving base station 210 through the communication unit 110.

When the monitoring module 122 monitors the reception signal of the reception module 112 and a situation in which the handover is required occurs, the monitoring module 122 notifies the situation to the scanning control module 123. For example, when a signal of the serving base station 210 that is received through the reception module 112 has a strength value that is smaller than a predetermined signal strength value, this can be notified to the scanning control module 123.

When there is a notification of the monitoring module 122, the scanning control module 123 transmits a scanning control request message (i.e., MOB_SCN-REQ) to the serving base station 210 through the primary carrier and switches the operation mode of the mobile station 100 to the scanning mode when a response message (i.e., MOB_SCN-RSP) to the request message is received from the serving base station 210. Alternatively, even when the scanning control module 123 does not transmit the scanning control request message (i.e., MOB_SCN-REQ) to the serving base station 210, when the serving base station transmits the message (i.e., MOB_SCN-RSP) to direct the scanning operation by its own determination, the scanning control module 123 may switch the operation mode of the mobile station 100 to the scanning mode.

In the scanning mode, as the mobile station 100 enters the scanning interval designated in the response message, the scanning module 124 performs the scanning of the neighbor base stations 220 and 230 through the secondary carrier designated in the response message. At this time, the transaction module 121 transmits and receives the general data to and from the serving base station 210 through the primary carrier without interruption.

In addition, in the scanning mode, when the scanning interval is deviated, the transaction module 121 transmits and receives the general data to and from the serving base station 210 through the primary carrier and the secondary carrier again.

Second Embodiment

The second embodiment relates to a case in which a scanning related control message is transmitted and received through a primary carrier and an actual scanning operation is performed through a primary carrier.

Figure 5:
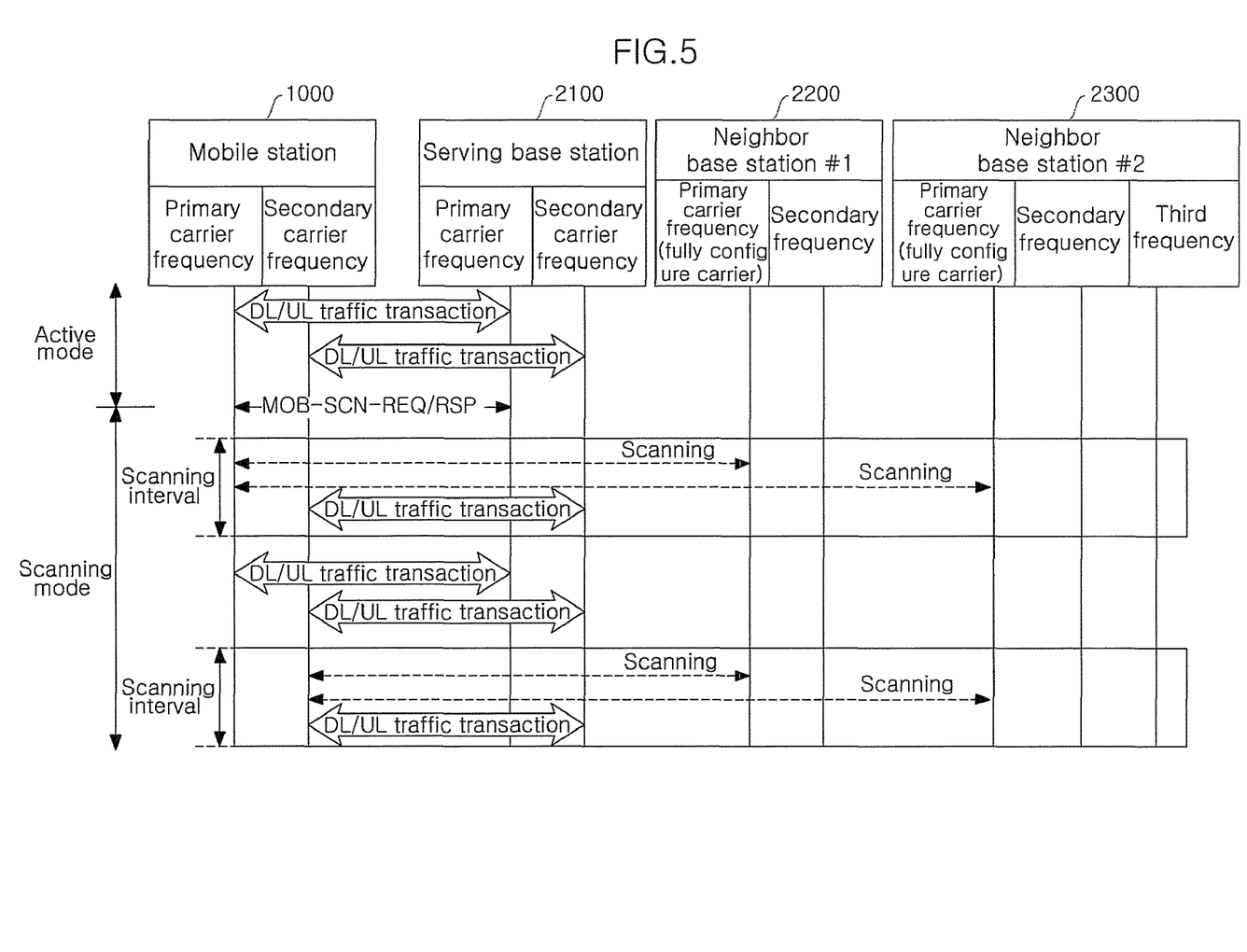
FIG. 5 is a signal flow diagram for describing a scanning operation according to a second embodiment of the present invention.
Figure 6:
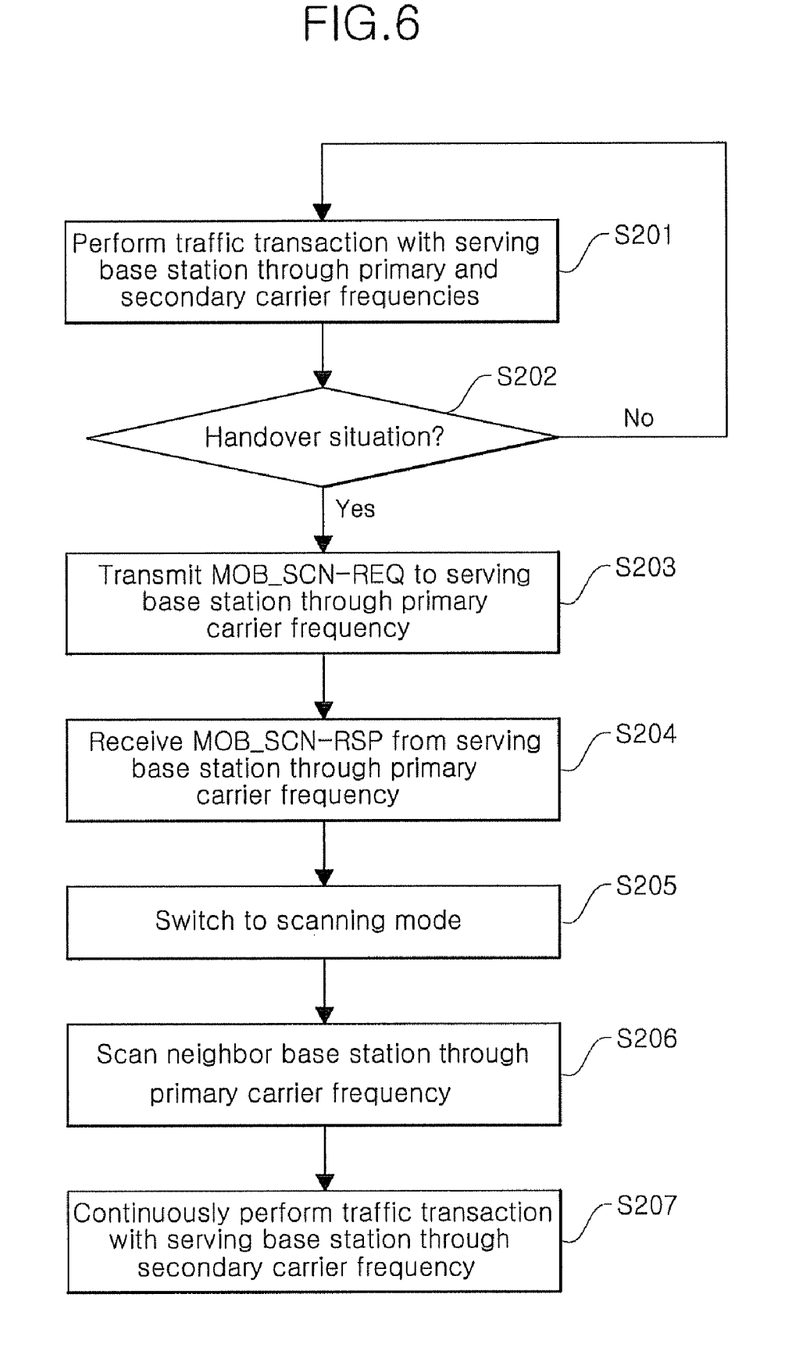
FIG. 6 is a flowchart sequentially illustrating a scanning operation in accordance with a signal flow diagram of FIG. 5.

FIG. 5 is a signal flow diagram for describing a scanning operation according to a second embodiment, and FIG. 6 is a flowchart sequentially illustrating a scanning operation in accordance with the signal flow diagram.

In an active mode, a mobile station 1000 performs uplink and downlink data traffic transactions with a serving base station 2100 by using a primary carrier and a secondary carrier (S201).

When the mobile station 1000 determines a situation in which handover is required while monitoring a reception signal from the serving base station 2100 (S202), the mobile station 1000 transmits a message (i.e., MOB_SCN-REQ) to request allocation of a scanning interval to the serving base station 2100 through the primary carrier (S203).

When the serving base station 2100 that receives the request message determines whether or not the scanning interval is allocated by considering a communication environment for the corresponding mobile station 1000 and determines that scanning is required, the serving base station 2100 transmits a response message (i.e., MOB_SCN-RSP) designating the size of the scanning interval and a carrier to be used for scanning to the mobile station 1000 through the primary carrier (S204).

The serving base station 2100 may direct the unsolicited scanning operation to the mobile station 1000 through the primary carrier even though the request message (i.e., MOB_SCN-REQ) is not received from the mobile station 1000. In this case, the serving base station can transmit the direction of the scanning operation through a predetermined message (i.e., MOB_SCN-RSP).

The mobile station 1000 that receive the response message switches an operation mode of the mobile station 1000 from the active mode to a scanning mode regardless of an operation state of carrier other than the primary carrier (S205), and designates the primary carrier as a carrier for scanning as designated in the response message. Thereafter, in the scanning interval of the scanning mode, only the scanning operation is performed with neighbor base stations 2200 and 2300 by the primary carrier, and transmission and reception of general data to and from the serving base station 2100 are excluded.

In the scanning mode, when the scanning interval arrives, the mobile station 1000 performs the scanning of the neighbor base stations 2200 and 2300 through the primary carrier (S206), while the general data is continuously transmitted and received through the secondary carrier (S207). In addition, in the scanning mode, when the scanning interval is deviated, the general data is transmitted to and received from the serving base station 2100 through the primary carrier and the secondary carrier.

Figure 7:
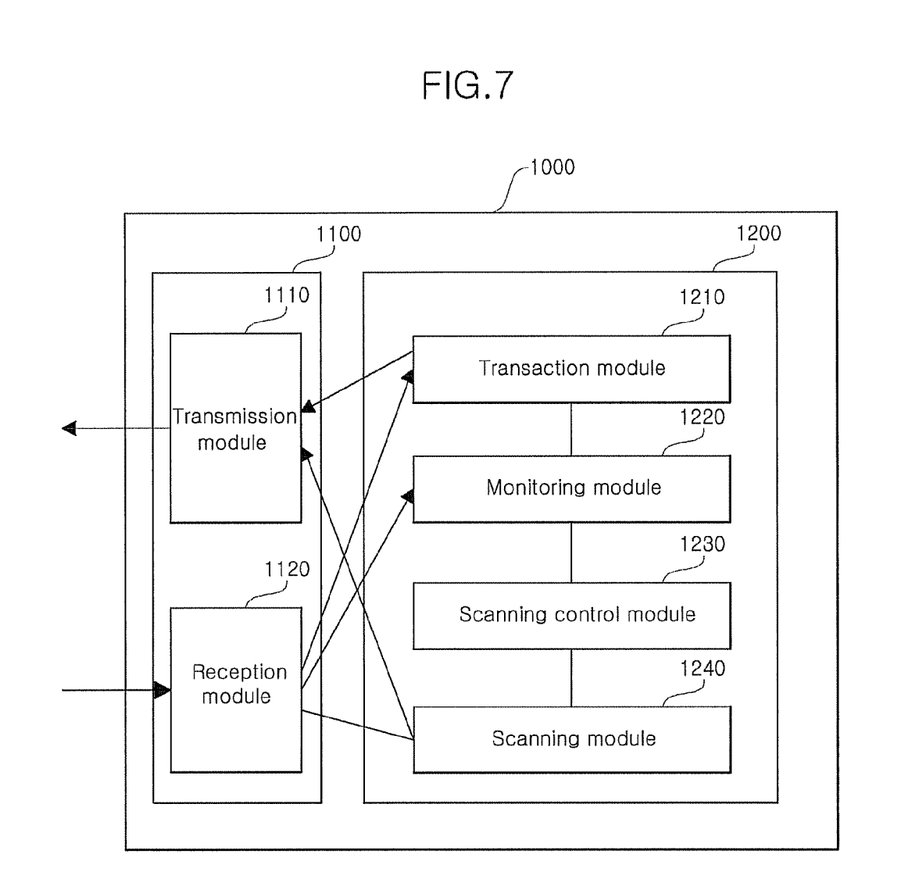
FIG. 7 is a block diagram schematically illustrating a configuration of a mobile station that performs a scanning operation of a second embodiment.

FIG. 7 is a block diagram schematically illustrating a configuration of a mobile station 1000 that performs a scanning operation of a second embodiment. The mobile station 1000 according to the second embodiment includes a communication unit 1100 and a control unit 1200. Herein, the communication unit 1100 is the same as the communication unit 110 of the first embodiment, such that only the control unit 1200 will be described herein.

The control unit 1200 includes a transaction module 1210, a monitoring module 1220, a scanning control module 1230, and a scanning module 1240.

The transaction module 1210 performs data traffic transaction with the serving base station 2100 through the communication unit 1100.

When the monitoring module 1220 monitors the reception signal from the serving base station 2100 and a situation in which the handover is required occurs, the monitoring module 1220 notifies the situation to the scanning control module 1230.

When there is a notification of the monitoring module 1220, the scanning control module 1230 transmits a scanning control request message (i.e., MOB_SCN-REQ) to the serving base station 2100 through the primary carrier, and switches the operation mode of the mobile station 1000 to the scanning mode when a response message (i.e., MOB_SCN-RSP) to the request message is received from the serving base station 2100. Alternatively, although the scanning control request message is not transmitted, when the serving base station 2100 transmits a predetermined message (i.e., MOB_SCN-RSP) to direct the scanning, the operation of the mobile station 1000 is switched to the scanning mode.

In the scanning mode, as the mobile station 1000 enters the scanning interval, the scanning module 1240 performs the scanning of the neighbor base stations 2200 and 2300 through the primary carrier. At this time, the transaction module 1210 transmits and receives the general data to and from the serving base station 2100 through the secondary carrier without interruption.

In addition, in the scanning mode, when the mobile station 1000 deviates from the scanning interval again, the transaction module 1210 again transmits and receives the general data to and from the serving base station 2100 through the primary carrier and the secondary carrier.

According to the embodiments of the present invention, since scanning can be performed without interruption of transmission and reception of data while observing a known rule of a scanning operation of a mobile station and a predetermined carrier can be used for the scanning operation, it is possible to efficiently utilize resources so as to meet the intent of a multi-carrier scheme.

The above-mentioned exemplary embodiments of the present invention are not embodied only by an apparatus and/or method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for scanning in a mobile station supporting a multi-carrier comprising a first carrier and a second carrier, comprising:
   transmitting a scanning request (SCN-REQ) message to a serving base station on the first carrier;
   receiving a scanning response (SCN-RSP) message comprising a scanning interval for scanning from the serving base station on the first carrier; and
   scanning neighbor base stations on the second carrier in the scanning interval,
   wherein the mobile station continues communication with the serving base station on the first carrier during the scanning.

2. The method of claim 1, wherein
   the SCN-REQ message further comprises information on a requested carrier to be used for the scanning.

3. The method of claim 1, further, comprising,
   when the response message is received from the serving base station, switching an operation mode of the mobile station to a scanning mode.

4. The method of claim 1, wherein
   a target carrier of the neighbor base station scanned through the second carrier is a fully configured carrier including a synchronization channel, a broadcast channel, and a control channel of the traffic transaction for the neighbor base station.

5. A method for scanning in a mobile station supporting a multi-carrier comprising a first carrier and a second carrier, comprising:
   requesting allocation of a scanning interval to a serving base station by using the first carrier;
   receiving a response message for designating the scanning interval and a carrier to be used for scanning from the serving base station; and
   scanning neighbor base stations by using the carrier designated by the response message in the scanning interval,
   wherein a carrier designated by the response message is the first carrier,
   wherein in the scanning interval, the traffic transaction with the serving base station is performed through the second carrier while the scanning is performed by using the first carrier.

6. The method of claim 5, further comprising,
   when the response message is received from the serving base station, switching the operation mode of the mobile station to the scanning mode.

7. A scanning apparatus supporting a multi-carrier comprising a first carrier and a second carrier, comprising:
   a scanning control module that transmits a scanning request (SCN-REQ) message to a serving base station on the first carrier and receives a scanning response (SCN-RSP) message comprising a scanning interval for scanning from the serving base station on the first carrier; and
   a scanning module that scans neighbor base stations on the second carrier in the scanning interval; and
   a transaction module that performs communication with the serving base station by using one of the first carrier, the second carrier and both the first carrier and the second carrier,
   wherein the transaction module continues communication with the serving base station on the first carrier while the scanning module scans neighbor base stations on the second carrier.

8. The scanning apparatus of claim 7, wherein
   the scanning control module switches an operation mode of the mobile station to a scanning mode when receiving the response message from the serving base station.

9. The scanning apparatus of claim 7, wherein
   a target carrier of the neighbor base station scanned through the second carrier is a fully configured carrier including a synchronization channel, a broadcast channel, and a control channel of the traffic transaction for the neighbor base station.

10. A scanning apparatus supporting a multi-carrier comprising a first carrier and a second carrier, comprising:
    a scanning control module that receives a message for designating a scanning interval and a carrier that will perform scanning from the serving base station;
    a scanning module that scans neighbor base stations by using the carrier designated by the message in the scanning interval; and
    a transaction module that performs communication with the serving base station by using one of the first carrier, the second carrier and both the first carrier and the second carrier, wherein a carrier designated by the response message is the first carrier, wherein the transaction module continues communication with the serving base station on the second carrier while the scanning module scans neighbor base stations on the first carrier.

11. The scanning apparatus of claim 10, wherein when the response message is received from the serving base station, the scanning control modules switches the operation mode of the mobile station to the scanning mode.

12. A method for managing a multi-carrier including a first carrier and a second carrier in a serving base station, comprising:

receiving a scanning request message from a mobile station on the first carrier; and transmitting a scanning response message comprising a scanning interval for the mobile station to scan neighbor base stations on the second carrier in the scanning interval, wherein the serving base station continues communication with the mobile station on the first carrier during the scanning interval.

* * * * *